United States Patent [19]

Ellis et al.

[11] 4,290,668

[45] Sep. 22, 1981

[54] FIBER OPTIC WAVEGUIDE TERMINATION AND METHOD OF FORMING SAME

[75] Inventors: Roger H. Ellis, Atherton; Raymond Clarke, Mt. View, both of Calif.

[73] Assignee: Raychem Corporation, Menlo Park, Calif.

[21] Appl. No.: 964,506

[22] Filed: Nov. 29, 1978

[51] Int. Cl.³ .............................................. G02B 5/14
[52] U.S. Cl. ............................. 350/96.20; 65/3.41; 65/3.44; 350/96.21; 427/163
[58] Field of Search ............ 65/3 C; 350/96.20, 96.21, 350/96.22, 96.23, 96.34; 427/163, 165, 169; 428/361, 421, 422

[56] References Cited

U.S. PATENT DOCUMENTS

| | | | |
|---|---|---|---|
| 2,027,962 | 1/1936 | Currie | 264/230 |
| 3,086,242 | 4/1963 | Cook et al. | 264/566 |
| 3,396,460 | 8/1968 | Wetmore | 29/629 |
| 3,455,625 | 7/1969 | Brumley et al. | 350/96.22 |
| 3,509,012 | 4/1970 | Marzocchi | 350/96.34 X |
| 3,930,103 | 12/1975 | Chimura et al. | 428/361 |
| 3,980,390 | 9/1976 | Yamamoto et al. | 350/96.34 X |
| 3,993,834 | 11/1976 | Chimura et al. | 428/421 X |
| 3,999,837 | 12/1976 | Bowen et al. | 350/96.22 |
| 4,113,346 | 9/1978 | Jackson et al. | 350/96.20 |
| 4,118,100 | 10/1978 | Goell et al. | 350/96.20 |
| 4,125,644 | 11/1978 | Ketley et al. | 427/163 X |
| 4,127,319 | 11/1978 | Forney, Jr. et al. | 350/96.20 |
| 4,134,641 | 1/1979 | Kao et al. | 350/96.21 |
| 4,148,554 | 4/1979 | Magnusson et al. | 350/96.21 |
| 4,176,909 | 12/1979 | Prunier | 350/96.20 |
| 4,186,999 | 2/1980 | Harwood et al. | 350/96.21 |
| 4,196,965 | 4/1980 | Matsuno | 350/96.21 |
| 4,198,119 | 4/1980 | Uberbacher | 350/96.20 |

FOREIGN PATENT DOCUMENTS

| | | | |
|---|---|---|---|
| 2721347 | 11/1978 | Fed. Rep. of Germany | 350/96.20 |
| 102134 | 8/1979 | Japan | 350/96.20 |
| 1037498 | 7/1966 | United Kingdom | 350/96.34 |
| 1448975 | 9/1976 | United Kingdom | 350/96.21 |

OTHER PUBLICATIONS

Borsuk, "What All Connector Engineers Should Know . . .", *Insulation/Circuits*, Aug. 1978, pp. 43-49.
Special Report on Fiber Optics, *Electronic Design*, Oct. 25, 1978, pp. 53-126.

*Primary Examiner*—John K. Corbin
*Assistant Examiner*—John D. Lee
*Attorney, Agent, or Firm*—Lyon & Lyon

[57] ABSTRACT

A soft polymeric clad glass fiber waveguide with an easy to handle, low-loss end termination is disclosed. Each end termination is formed with a pair of telescopically assembled plastic sleeves. The inner sleeve is heat bondable to the glass core and has a refractive index lower than the glass core. It replaces an end portion of the soft rubbery polymeric cladding. The outer sleeve is heat shrinkable and during the termination procedure functions to compress, center and confine the inner sleeve. After termination, it functions to stiffen the fiber end and strain relieve the junction between the soft polymeric cladding and the stiffer inner sleeve. A method for making such a waveguide termination is disclosed. Also disclosed is an environmentally sealed optical waveguide of related construction.

24 Claims, 15 Drawing Figures

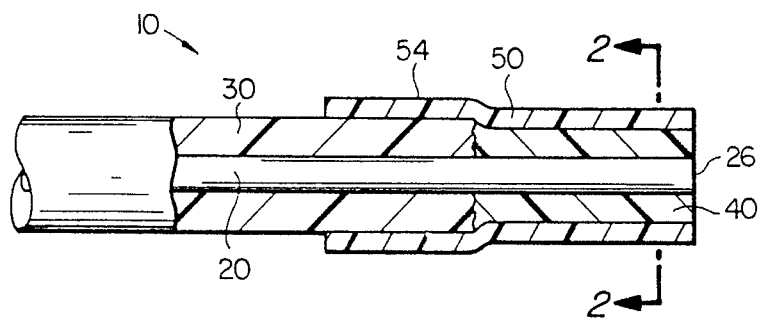
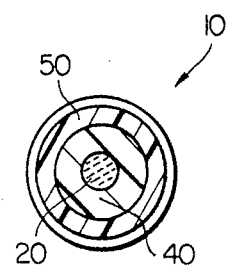
FIG_1  FIG_2
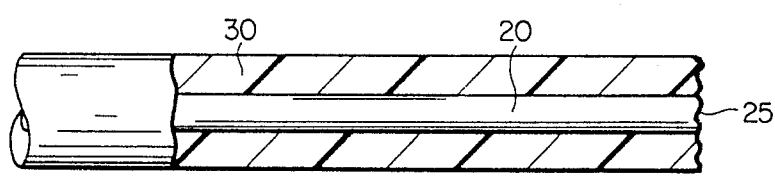
FIG_3
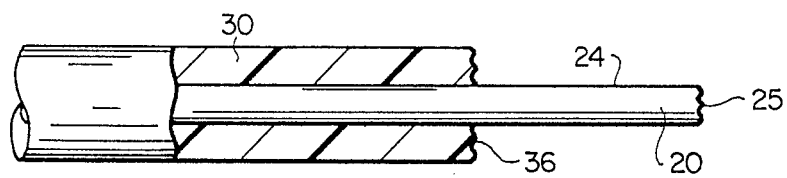
FIG_4
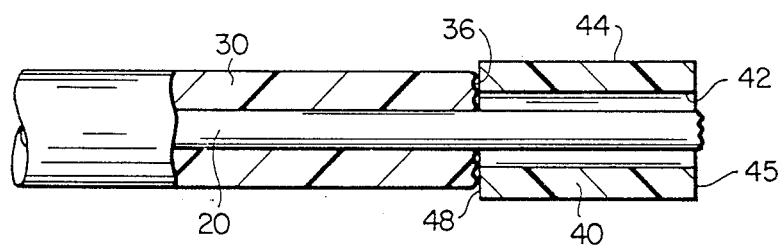
FIG_5
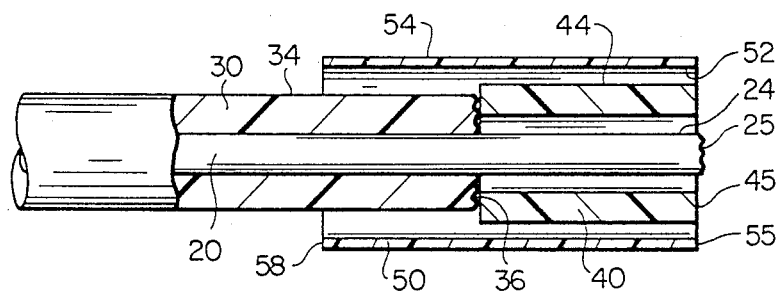
FIG_6

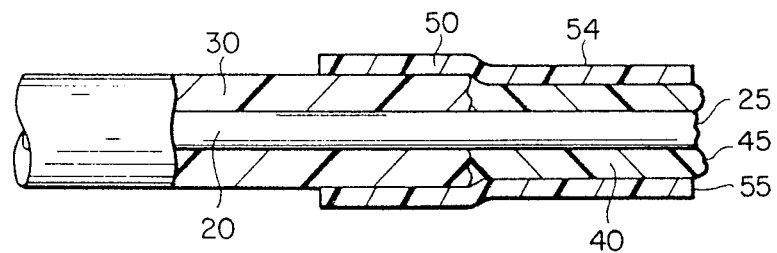
FIG_7
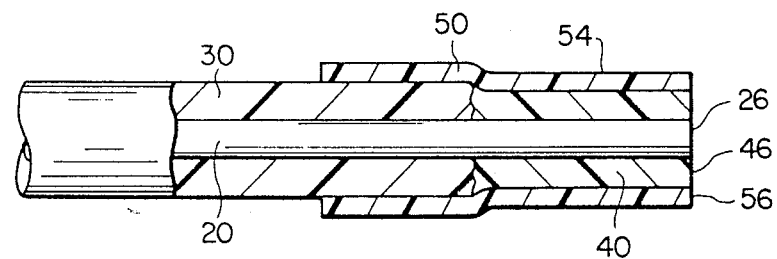
FIG_8
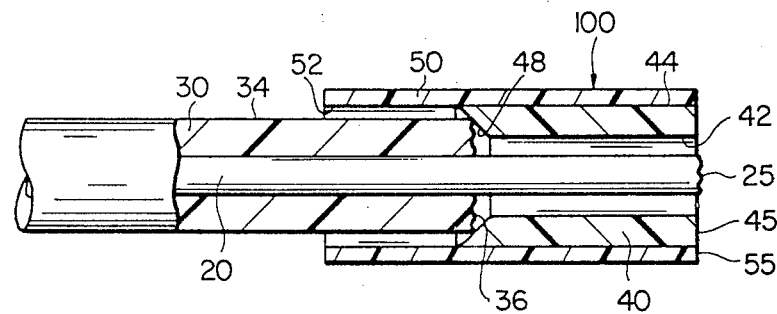
FIG_9
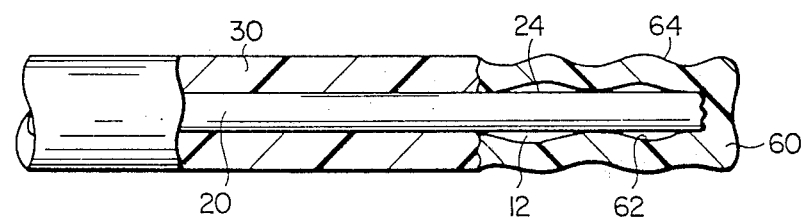
FIG_10
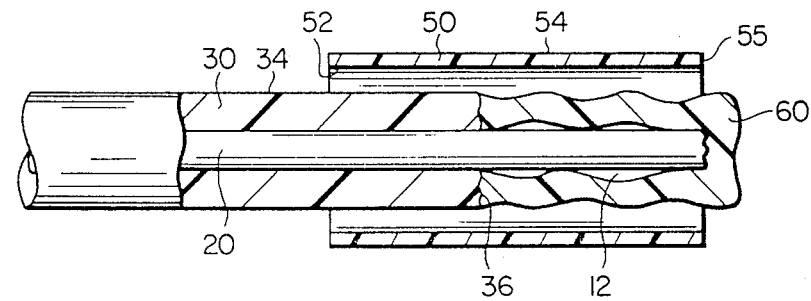
FIG_11

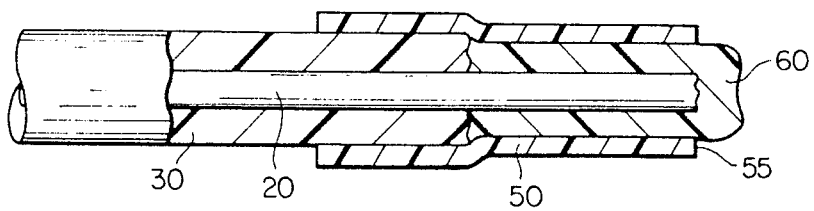
FIG_12
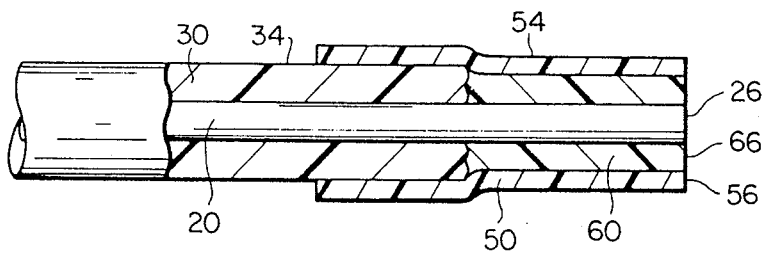
FIG_13
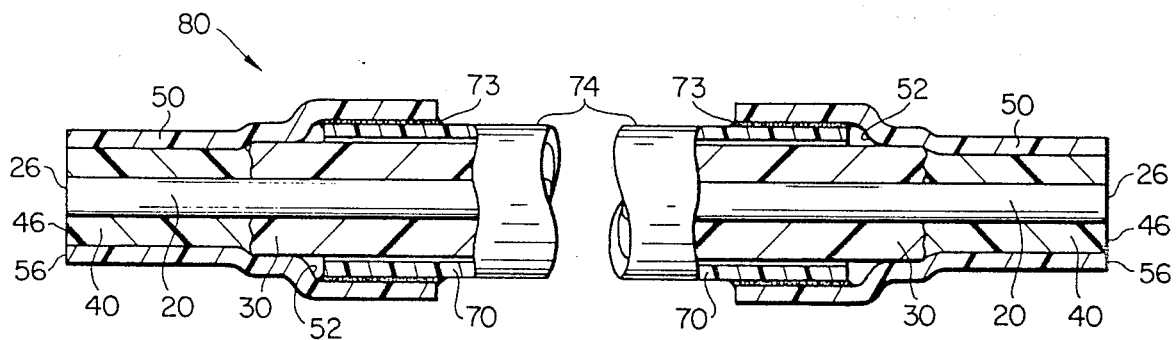
FIG_14
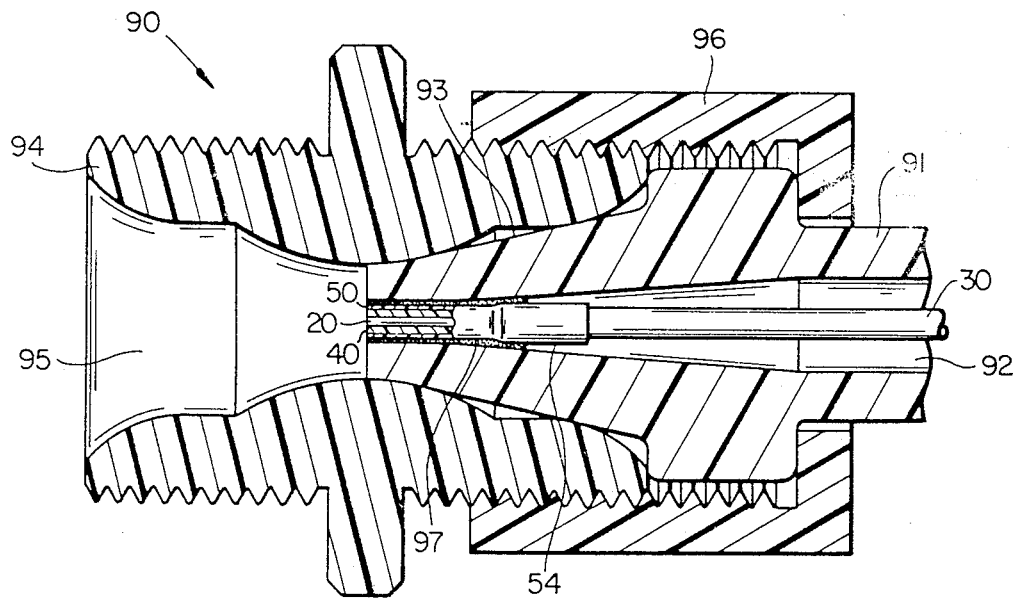
FIG_15

FIBER OPTIC WAVEGUIDE TERMINATION AND METHOD OF FORMING SAME

BACKGROUND OF THE INVENTION

I. Field of the Invention

This invention relates generally to glass fiber optical waveguides. More specifically, the invention relates to those waveguides that propagate light at least in part through the mechanism of reflection at the interface between the exterior surface of a glass core and a polymer cladding, typically silicone rubber.

II. Description of the Prior Art

The past few years have witnessed the rapid emergence of fiber optic technology from laboratories around the world into a wide variety of commercial applications. This emerging technology has given rise to many inventions, patents, books and other technical publications. A recent and quite readable overview article which contains a glossary of the more commonly used electroptical terms is authored by L. Borsuk, and entitled "What All Connector Engineers Should Know About Fiber Optics", *Insulation/Circuits,* August, 1978, Pages 43-49. The Oct. 25, 1978 issue of *Electronic Design* contains a special report assessing fiber optic technology which begins on page 53 thereof. The above identified article and special report are both incorporated by reference herein.

The final design of any fiber optic information transmission system is a complex function of many system component characteristics and engineering tradeoffs. Although many optical waveguide constructions are known, the characteristics associated with each construction vary widely and, therefore, the type of waveguide used in any given system must be matched to that system's requirements.

One optical waveguide construction which offers a number of desirable attributes has a stepped refractive index profile. Such a profile is usually obtained when a homogeneous glass core, is surrounded by a lower refractive index cladding of glass or polymer. A waveguide so constructed propagates light through the reflection of rays at the interface between the exterior surface of the glass core and the cladding.

Another optical waveguide construction uses a core with a graded refractive index profile. Typically, such profiles are formed when the refractive index decreases outwardly from the center of the core. Such a waveguide propagates light through the refraction of rays at selected regions within the core. It is to be understood that a waveguide which propagates light at least in part through the reflection of rays at the interface between the exterior surface of the core and the cladding and at least in part through the refraction of rays at selected regions within the core can be fabricated and may be useful in certain applications.

Polymer clad step index glass fiber waveguides are relatively simple to fabricate compared to other waveguide constructions. They are relatively easy to launch light into because of their large numerical apertures (typically 0.2 to 0.4) and, in theory at least, should be easier to interconnect because their relatively large core diameters (typically 125 to 400 microns) can tolerate greater axial misalignment than waveguides with smaller core diameters (typically 5 to 75 microns). In addition, polymer clad glass fiber waveguides appear to be less susceptible to the adverse effects of ionizing radiation at levels in excess of 1 Mrad than other waveguide constructions.

Large core diameter, step index waveguides allow light to propagate in many modes. Some modes have longer optical paths to traverse than others. These unequal optical path lengths result in undesirable signal dispersion over long distances. Although such dispersion ultimately limits the signal bandwidth of such waveguides, there are many applications requiring a waveguide less than one kilometer in length where some signal dispersion at selected information transmission rates can be tolerated.

A variety of polymers have been used to form the cladding layer which surrounds the core. In particular, silicone base polymers have proven useful in cladding waveguides to achieve low levels of signal attenuation (less than 10 dB per kilometer when measured at 820 nanometers). However, two well known problems associated with prior art silicone clad glass waveguides have limited their more widespread use. First, the soft, rubbery nature of silicone base polymers renders waveguides clad with such materials, difficult if not impossible to terminate without significant signal losses. Second, the inability of silicone base polymers to function as an effective moisture barrier leaves the surrounded glass waveguide core vunerable to moisture enhanced stress cracking.

Prior art efforts to overcome these problems have not been successful. For example, attempts have been made to bond the silicone to a connector ferrule or other waveguide supporting structure. The strength of such a termination is inherently limited by the strength of the glass to silicone bond and/or the shear strength of the silicone material itself. In addition, because the glass core is not securely held, it is subject to some axial, radial and rotational displacement when a remote portion of the waveguide cable is moved such as by twisting, coiling or pulling. In the situation where a waveguide is terminated in abutment to an optical source or detector, such as a light emitting diode, laser diode, photo transistor or the like, even a small amount of fiber end displacement can result in damage to these components. Fiber end motion in a waveguide connector can make the connection losses a variable function of waveguide cable placement. Moreover, in terminating a silicone clad waveguide in a connector, two additional considerations should be kept in mind. First, to achieve a low loss connection between two waveguides, it is essential that the longitudinal axes of their cores be closely aligned. Although their alignment can be accomplished in many ways, one of the most attractive is to employ a connector with an aligned bore which centers the glass core therein. As a practical matter, such centering is difficult to achieve with a silicone clad waveguide as the outside diameter and concentricity of the cladding must be precisely controlled to just fit within the connector bore while at the same time the core must be precisely centered within the cladding. Second, assuming the waveguide has been centered and secured within the connector bore, it is still necessary that the end surface of the core possess an optically smooth finish. Such a surface can be obtained by either cleaving the glass core or by polishing the end with a series of increasingly fine abrasives. Although cleaving can provide a very smooth finish, abrasive polishing is generally preferred because the polishing operation can be used to accurately establish a predetermined relationship between the core end and the connector body thereby providing better control of the lateral spacing between aligned core end surfaces. One problem encountered in the prior art when attempting to polish a core end is that the surrounding silicone cladding is too soft to provide adequate support. Therefore, the core is allowed to bend back and forth during polishing. This motion frequently causes the edge of the core to chip and break. At best, the core end becomes polished with a slightly convex rather than flat surface which increases attenuation.

Attempts have been made to avoid some of these problems by using silicone base polymers with a variety of additives to make the cladding stiffer and therefore easier to work with. These attempts have all adversely effected the overall attenuation characteristics of the waveguide.

It would appear that using a hard and rigid low refractive index polymer as the cladding would be advantageous. In practice, it has been found that if such a material is used for the cladding, then unacceptable microbending losses are induced in the waveguide. Soft polymeric and specifically silicone rubbers when used as the waveguide cladding are advantageous in that they help to cushion the waveguide from induced microbending losses.

Another prior art approach to terminating silicone clad waveguides has been to remove an end portion of the cladding and form an adhesive bond between the exterior cylindrical surface of the core and the bore of a connector or other waveguide supporting structure. If an adhesive is used which does not have a lower refractive index than the core, then a high loss termination is produced.

The minimum low refractive index cladding thickness is at least 3 and preferably at least 12 times the wavelength of the light to be propagated. If this minimum thickness criteria is not met, then undesirable light loss from the core will also result. Therefore, even if an adhesive with a sufficiently low refractive index is used, it is still important that the core be spaced sufficiently apart from the waveguide support structure to avoid light losses.

Prior art efforts to terminate silicone clad waveguides have also included dipping an end of a glass core with no cladding into a solution of a dissolved, heat fusible polymer having a refractive index lower than the refractive index of the exterior surface of the glass core. The core is slowly withdrawn from the solution and warmed with hot air thereby causing the solvent to evaporate and the polymer to fuse into a thin layer. In theory, this procedure can be repeated as many times as necessary to build up as thick a polymer layer as is desired. In practice, the polymer residue left on the surface of the core after the cladding has been stripped off is difficult to remove entirely and is difficult to bond to. As a result of these difficulties, the polymer layer formed by dip coating is frequently not entirely bonded to the glass and not uniformly distributed around the core. Not only is this procedure time consuming and craft sensitive, but also, it does not provide a practical solution to the problem of centering and bonding a small diameter core within a bore of an inexpensive waveguide connector. This technique is more fully described in the article by R. L. Warkentine, entitled "To Terminate Plastic Clad Silica Fibers, First Strip and Reclad the Ends", *Electronic Design*, Oct. 25, 1978, Pages 118 and 119.

SUMMARY OF THE INVENTION

The present invention overcomes many of the disadvantages associated with polymer clad glass optical waveguides known in the prior art. It does so by providing a waveguide with a novel, low light loss, waveguide termination structure and a method for fabricating same. The structure includes a first polymeric sleeve having a refractive index numerically lower than the refractive index of the exterior cylindrical surface of the glass core. This first sleeve abuts the unremoved portion of the polymeric waveguide cladding. The structure further includes a second polymeric sleeve of greater longitudinal length than the first sleeve which is telescopically disposed over the first sleeve and a portion of the unremoved polymeric cladding. The first sleeve is bonded to both a portion of the exterior surface of the core and a portion of the interior surface of the second sleeve. The resulting structure functions to strain relieve the junction between the first sleeve and the unremoved portion of the polymer cladding and provide an easy to handle termination wherein the core is substantially centered an mechanically restrained from any motion relative to the outer surface of the second sleeve, all without substantial degradation of the light propagating capability of the waveguide. An environmentally sealed waveguide can be fabricated in accordance with the invention by the provision of an adhesive seal between a portion of the interior surface of the second sleeve surrounding an unremoved portion of the cladding and an immediately underlying portion of a tubular, environmentally protective jacket that has been disposed coaxially over the waveguide core and cladding. An important object of the invention is to provide a low light loss termination for a polymer clad glass waveguide. Another object of the invention is to provide a method for fabricating such a terminated waveguide. A further object of the invention is to provide an environmentally sealed polymer clad glass core waveguide. An advantage of the invention is that the transition between the termination and the waveguide cladding is strain relieved. Another advantage of the invention is that the glass core can be substantially centered with respect to the larger diameter exterior surface of the second sleeve. Yet another advantage of the invention is that the end of the waveguide is stiffened, strengthened and made easier to handle. Waveguides fabricated in accordance with the invention enjoy the advantage of being readily installed with good alignment into waveguide connectors of the type which possess a pre-aligned bore. Still another advantage of the invention is that the end of the core is securely held by the two sleeves and will not move back and forth during polishing thereby allowing the end of the core to be polished to a flat surface.

BRIEF DESCRIPTION OF THE DRAWINGS

The many other objects and advantages of the present invention will become apparent to those skilled in the art when the following description of the best mode contemplated for practicing the invention is read in conjunction with the accompanying drawings wherein like reference characters refer to the same or similar elements, and in which:

FIG. 1 is a partial side cross-sectional view of an optical waveguide according to the invention;

FIG. 2 is an end view of the waveguide shown in FIG. 1 as seen through the lines 2—2;

FIG. 3 is a partial cross-sectional view of an end portion of a polymer clad glass core optical waveguide prior to termination;

FIG. 4 is a partial cross-sectional view of the waveguide of FIG. 3 with a portion of the polymer cladding removed;

FIG. 5 is a partial cross-sectional view of the waveguide shown in FIG. 4 with a first polymeric sleeve disposed around the core;

FIG. 6 is a partial cross-sectional view of the assembly shown in FIG. 5 around which a heat-shrinkable second polymeric sleeve has been disposed;

FIG. 7 is a partial cross-sectional view of the bonded structure formed by heating the assembly shown in FIG. 6;

FIG. 8 is a partial cross-sectional view of the bonded structure shown in FIG. 7 after the end of the glass core has been given an optically smooth finish;

FIG. 9 illustrates a presently preferred intermediate structure wherein the first and second polymeric sleeves are pre-bonded together to form a subassembly;

FIGS. 10 through 13 inclusive illustrate a variation of the method of the invention which forms the inner polymeric sleeve directly on the glass core through a dip coating process;

FIG. 14 is a partial cross-sectional view of an environmentally sealed polymer clad glass fiber waveguide in accordance with the invention; and FIG. 15 is a partial cross-sectional view of a prior art optical waveguide connector with the waveguide of the invention self centered and bonded within the connector's prealigned bore.

DETAILED DESCRIPTION OF THE PREFERRED EMBODIMENT

Referring now generally to the several figures and specifically to FIG. 1, there is shown in partial cross-section, a portion of an optical waveguide 10 which has been terminated in accordance with the invention. The waveguide 10 is formed with a glass core 20 possessing a flat, optically smooth end surface 26. The glass core 20 is typically pure, fused silica. As such, it is essentially homogeneous. The core 20 is surrounded along most of its length by a polymeric cladding 30 which possesses a refractive index numerically lower than the refractive index of the fused silica core 20 (which is typically 1.46). A portion of the cladding 30 has been removed and replaced with a first polymeric sleeve 40 bonded to the exterior surface of the core 20. A second polymeric sleeve 50 is telescopically disposed around and bonded to the exterior surface of the first sleeve 40. Preferably the first and second sleeves 40 and 50 possess walls which are of substantially uniform thickness when viewed through any plane normal to their longitudinal centerlines. When the sleeve walls are so configured, the glass core 20 is substantially centered with respect to the exterior surface of the second sleeve 50 as is shown in FIG. 2.

The waveguide termination shown in FIG. 1 can be formed by a series of steps which are illustrated sequentially in FIGS. 3 through 8 inclusive. FIG. 3 is a partial cross-sectional view of an end portion of a polymer clad glass core optical waveguide prior to termination. The end surface 25 of the glass core 20 is shown in a rough, unpolished condition. FIG. 4 is a partial cross-sectional view of the waveguide shown in FIG. 3 with a tubular, terminal portion of the polymer cladding 30 removed thereby exposing a substantially cylindrical exterior surface portion 24 of the glass core 20. In a typical situation where the polymer cladding 30 is a silicone rubber material, the end portion of the cladding can be easily stripped off by the use of fingernails alone. The length of cladding which is removed is approximately equal to the length of the first sleeve 40 which can be of any convenient length but is preferably about 1 centimeter long. Where a silicone base polymer cladding 30 is used there is frequently left behind a silicone residue on the exterior cylindrical surface 24. Such a residue renders the surface 24 difficult to bond to and limits the strength of any bond formed thereto. Although the invention will provide satisfactory results, even in the presence of such a residue, superior results will be obtained if the surface 24 is carefully cleaned with a solvent such as tetra methyl guanidine to remove the silicone residue.

FIG. 5 is a partial cross-sectional view of the waveguide shown in FIG. 4 with the first polymeric sleeve 40 disposed around the core 20. The sleeve 40 possesses a substantially cylindrical interior surface 42, an exterior surface 44 and a pair of annular end surfaces 45 and 48. The annular end surface 48 is juxtaposed on unremoved portion 36 of the cladding 30 as shown.

In selecting a material for the first sleeve 40 a number of considerations must be kept in mind. First, the sleeve must be fabricated from a material which possesses a refractive index numerically lower than the refractive index of the exterior surface 24 of the glass core 20. The refractive index of pure fused silica is about 1.46. Perfluorinated ethylene propylene copolymer possesses a refractive index of about 1.338 and is believed to possess the lowest refractive index of commercially available polymers. Second, the difference between the refractive index of the cladding and the refractive index of the core determines the numerical aperture of the waveguide. Third, when using a pure fused silica core 20 which possesses a refractive index of about 1.460, a measurable signal loss results when the material selected for the first sleeve 40 possesses a refractive index greater than 1.440. Based on limited test results, it would appear prudent to fabricate the first sleeve 40 from a material which possesses a refractive index that is numerically at least 0.02 lower than the refractive index of the exterior surface 24 of the glass core 20 with which the first sleeve 40 is to be used. As a practical matter, this minimum differential in indices of refraction is not a critical consideration as other factors suggest the use of polymeric materials which provide even larger index of refraction differentials. A fourth consideration in selecting a polymeric material for the sleeve 40 is that it be capable of forming a bond with the exterior surface 24 of the glass core 20 preferably in the presence of some polymer cladding residue such as, for example, a silicone polymer residue. Fifth, although the material selected should soften and fuse upon heating so as to be able to wet the surface 24, it should remain very viscous and uniformally disposed around the fiber core 20. A material which is compatible with the foregoing considerations is substantially uncross-linked polyvinylidenefluoride. Crosslinking of the polyvinylidene fluoride to any extent inhibits the polymer from flowing and wetting the surface of the waveguide. This polymer possesses a refractive index of 1.42 and is sold under the Trademark "KYNAR" by Pennsalt Chemical Corporation, Philadelphia, Pennsylvania. To enhance the ability of Kynar to bond to glass a silane coupling agent can be applied to the glass prior to bonding. This silane functions by providing reactive sites on which the Kynar can bond. An example of such a coupling agent is N-(2-amino ethyl)-3 amino propyltrimethoxysilane, (Z6020) supplied by Dow Corning Corporation, Midland, Michigan.

FIG. 6 is a partial cross-sectional view of the assembly shown in FIG. 5 around which the heat-shrinkable second polymeric sleeve 50 has been disposed. The sleeve 50 possesses an inner surface 52, an outer surface 54 and a pair of annular surfaces 55 and 58 respectively. The annular end surface 55 is preferably aligned with the annular end surface 45 on the first sleeve and the unpolished end 25 on the glass core 20. Alignment of these surfaces is not critical as they will all be brought into alignment with one another subsequently. The properties and manufacture of heat-recoverable articles are taught in the prior art by, for example, U.S. Pat. No. 2,027,962, issued to L. M. Currie on Jan. 14, 1936 and U.S. Pat. No. 3,086,242 issued to P. M. Cook et al. On Apr. 23, 1963.

The assembly shown in FIG. 6 is then heated with a hot air gun, an infra-red heating device or the like, thereby causing the first sleeve 40 to soften and fuse and the second sleeve 50 to shrink radially driving the softened first sleeve into uniform circumferential contact with the exterior surface 24 of the glass core 20. The softened annular end surface 48 is simultaneously driven into intimate contact against the unremoved portion of the cladding 30 filling any interstices in the surface 36. Although the first sleeve 40 is sufficiently fused to wet and bond to the surface 24 it remains uniformally distributed about the core 20 to facilitate the centering of the core 20 with respect to the exterior surface 54 of the second sleeve 50. FIG. 7 is a partial cross-sectional view of the bonded structure formed by heating the assembly shown in FIG. 6 and allowing that structure to cool. After cooling, the structure formed by the core 20, the first sleeve 40 and the second sleeve 50 is quite stiff. How well centered the core 20 is with respect to the exterior surface 54 of the second sleeve 50 is a function of the initial uniformity of wall thickness possessed by the first and second sleeves and the care used in heating them. For example, better centering is achieved when heat is employed uniformally around the sleeves. Similarly, better core centering is obtained if the fiber is held vertically during the heat to shrink and bond procedure. It is to be understood that the method of the invention will provide an easy to handle low light loss waveguide termination entirely satisfactory for many applications even if the sleeve walls are not uniform and the heat to shrink and bond procedure is conducted carelessly. However, where sleeves with uniform wall thicknesses are used and care in heating is employed, applicants have been able to repetitively terminate waveguides with 200 micron diameter cores into a bonded structure approximately 1000 micron in diameter such that the core is centered within 25 microns. This centering capability allows waveguides terminated in accordance with the invention to be disposed and bonded into prealigned bores of inexpensive optical waveguide connectors. In many fiber optic transmission systems, the signal losses accocciated with connections so made are fully acceptable. It is to be further understood that the exterior surface 54 on the bonded structure shown in FIG. 7 need not be a right cylindrical surface. For example, to achieve better core centering within a prealigned bore of a waveguide connector, a portion of the surface 54 proximate the unpolished end 25 can be slightly tapered (cone shaped). When so configured, the terminated waveguide end can be pressed/wedged into a prealigned connector bore with less alignment dependance on a close tolerance relationship between the inside diameter of the connector bore and the outside diameter of the terminated waveguide end. Such a tapered termination can be formed, for example, by the use of a first sleeve 40 which possesses a uniform wall at the end proximate the unremoved cladding and tapers into a thinner uniform wall at the end proximate the core end 25.

FIG. 8 is a partial cross-sectional view of the bonded structure shown in FIG. 7 after the end of the glass core 20 has been given an optically smooth finish which is shown as polished end surface 26. During the polishing operation the annular end surfaces 45 and 55 on the first and second sleeves respectively have been made substantially flush with the polished end surface 26 and are shown as flush annular end surfaces 46 and 56 respectively. The flush end surfaces 26, 46 and 56 preferably all lie in a plane which is substantially perpendicular to the longitudinal axis of the core 20. As mentioned above, there are a variety of ways of providing the end of the core 20 with a polished end surface 26. For purposes of this application, the term "polishing" is to be understood to comprehend all known procedures for providing a glass surface with a smooth finish such as, for example, cleaving, polishing with a series of increasingly fine abrasives, cutting, fire polishing, etching, coating and the like. Because the termination of the invention holds the terminal portion of the core 20 rigidly within a pair of concentric sleeves, the core cannot bend back and forth while a series of increasingly fine abrasives are used to produce the polished end surface 26. Therefore, unlike the situation existing in the prior art, there is little tendency for the core edge to chip and break and little tendency for the surface 26 to be slightly convex.

FIG. 9 illustrates a presently preferred intermediate structure wherein the first and second polymeric sleeves are pre-bonded together to form a subassembly 100. The use of such a subassembly eliminates the difficulty of maintaining the desired longitudinal relationship between the two sleeves and the fiber core during the heat to shrink and bond procedure. The stripped fiber to be terminated can be positioned vertically and the subassembly 100 slipped over the fiber core as shown. This assures that no appreciable gap will be left between the surface 36 on the unremoved portion of the cladding 30 and the annular end surface 48 on the first sleeve 40. Preferably, the annular end surface 48 is slightly tapered and dimensioned with respect to the unremoved portion of the cladding 30 as shown. Such a configuration facilitates the insertion of the stripped core 20 into the central bore of the first sleeve 40 and allows the annular end surface 48 to function as a longitudinal locating surface which contacts the unremoved portion of the cladding 30.

FIGS. 10 through 13 inclusive illustrate a variation on the method of the invention which forms the first polymeric sleeve directly on the glass core through a dip coating process. A portion of the cladding 30 is again removed from the core 20 and preferably an effort is made to remove most of the cladding residue from the exterior surface of the core 20. The exposed portion of the core is then dipped into a solution of, for example, polyvinylidene fluoride in DIMETHYL FORMAMIDE or a solution of polyvinylidene fluoride tetra-fluoroethylene copolymer in acetone, and slowly withdrawn. Evaporation of the solvent carrier from the polymer can be facilitated through the use of, for example, a hot air gun. The polymer layer left behind forms a thin first sleeve 60. The sleeve 60 possesses an interior surface 62 and an exterior surface 64. Typically, the interior surface 62 is incompletely bonded to the exterior surface 24 of the core 20 thereby forming pockets or voids 12. FIG. 11 is a partial cross-sectional view of the waveguide shown in FIG. 10 around which the heat-shrinkable polymeric sleeve 50 is again disposed. In a fashion analogous to the procedure described in connection with FIG. 6 above, the assembly shown in FIG. 11 is heated with a hot air gun, an infrared heating device or the like thereby causing the first sleeve 60 to soften and fuse and the second sleeve 50 to recover and shrink radially thereby compressing and driving the softened first sleeve 60 into uniform circumferential contact with the exterior surface 24 of the glass core 20. This radial compressive force tends to squeeze out the pockets or voids 12 and enhance the ability of the fused first sleeve 60 to more thoroughly wet the exterior surface 24 of the core 20. FIG. 12 is a partial cross-sectional view of the bonded structure formed by heating the assembly shown in FIG. 11 and allowing that structure to cool. Again, the portion of the second sleeve 50 overlying and heat recovered around the remaining portion of the cladding 30 functions to strain relieve the junction between the cladding and the first sleeve 60 thereby protecting the fragile core 20 from breakage in that vicinity. FIG. 13 is a partial cross-sectional view of the bonded structure shown in FIG. 12 after the end of the glass core 20 has been given an optically smooth surface, shown again as polished end surface 26. Again, during the polishing operation the annular end surfaces 66 and 56 which are substantially flush with the polished surface 26 are formed on the first and second sleeves respectively as shown. Although a dip coating process can be used in the practice of the present invention, its use is not preferred as it is more time consuming, craft sensitive and does not function as reliably as a slip on type sleeve to center the fiber with respect to the exterior surface 54 of a bonded waveguide termination.

FIG. 14 is a partial cross-sectional view of an environmentaily sealed polymer clad glass fiber waveguide 80. As mentioned above, silicone based polymers are frequently used as a waveguide cladding material to form waveguides with large numerical apertures and low inherent attenuations for light with wavelengths around 820 nanometers. However, it is also well known that small glass fibers are particularly sensitive to moisture enhanced stress cracking when bent through small radii. Unfortunately, silicone based polymers are not particularly effective as barriers against moisture nor are they particularly abrasion resistant. In order to circumvent these shortcomings, silicone clad waveguides are frequently enclosed within an outer protective jacket 70 as illustrated in FIG. 14. Such a jacket provides abrasion protection for the underlying cladding 30 but is not sealed at the ends and therefore can allow moisture to migrate through the cladding and reach the exterior surface of the glass core 20. Optical waveguides used in a aircraft applications are particularly susceptible to this moisture problem because of the pervasive condensation which results from altitude cycling. The termination of the invention provides a simple and effective approach to environmentally seal the open ends of the protective jacket 70. The material used to form the protective jacket 70 is preferably a polymer which will act as a good moisture barrier such as, for example, polyethylene, polypropylene, polyvinylidene fluoride, polyethylene tetra fluoroethylene copolymer or polyvinylidene chloride. The protective jacket 70 possesses an exterior surface 74 which partially underlies and is bonded to a portion of the interior surface 52 on the second sleeve 50 as shown. The materials used to fabricate the second sleeve 50 and the protective jacket 70 can be selected such that they will bond with each other when the end of the waveguide is heated during the heat to shrink and bond procedure described above. For example, the second sleeve 50 can be fabricated from crosslinked Kynar and the protective jacket 74 can be fabricated from uncrosslinked Kynar. Alternatively, an adhesive 73 can be interposed between the overlapping portions of the exterior surface 74 and the interior surface 52 as shown. Such an adhesive 73 can be predisposed as a ring on a selected portion of the interior surface 52. It is to be understood that such a ring of adhesive can be predisposed on the subassembly 100 of first and second sleeves shown in FIG. 9. Preferably the adhesive 73 is a hot melt adhesive such as, for example, the adhesive described in U.S. patent application Ser. No. 882,391, (now U.S. Pat. 4,197,380) filed Mar. 1, 1978 and entitled "Hot Melt Adhesives". This application is assigned to Raychem Corporation, the assignee of the present invention, and the teachings contained therein are incorporated by reference herein.

FIG. 15 is a partial cross-sectional view of a portion of an optical waveguide connector 90 with the terminated waveguide of the invention self-centered and bonded therein. The waveguide connector 90 shown in FIG. 15 is illustrative of connectors that achieve axial alignment between a pair of to be connected waveguides through the use of prealigned concentric surfaces. In particular, the connector 90 employs a ferrule member 91 possessing an interior bore 92 which is centered with respect to a concentric exterior surface 93. A pair of ferrules 91 (only one of which is shown) are adapted to be received into opposite ends of a bushing 94. The bushing 94 possesses an interior reference surface 95 concentrically disposed about the sleeve's longitudinal axis. The exterior surface 93 on each ferrule 91 is adapted to engage a portion of the reference surface 95 thereby aligning the bore 92 with the longitudinal axis of the bushing 94. A cap 96 can be used to hold the ferrule 91 and the bushing 94 together. Such a connector 90 is more fully described in U.S. Pat. No. 3,999,837 issued on Dec. 28, 1976 to T.P. Bowen et al, the disclosure of which is incorporated herein by reference. The second sleeve 50 is dimensioned to fit snugly within the terminal portion of the prealigned bore 92 and can be secured in place by an adhesive 97 such as a cyano acrylate or an epoxy resin. As described above, the longitudinal axis of the glass core 20 is substantially centered with respect to the exterior surface 54 on the second sleeve 50. Therefore, because the second sleeve 50 fits snugly within the terminal portion of the prealigned bore 92, the longitudinal axis of the core 20 is substantially aligned with the longitudinal axis of the bushing 94 thereby ensuring substantial alignment between juxtaposed waveguides.

From the foregoing detailed description, it will be evident that there are a number of changes, adaptations and modifications of the present invention which come within the province of those skilled in the art; however, it is intended that all such variations not departing from the spirit of the invention be considered as within the scope thereof as limited solely by the appended claims.

We claim:

1. An optical waveguide comprising:
   a glass fiber core possessing at least one polished end surface and a substantially cylindrical exterior surface;
   a polymeric cladding disposed on and around said exterior surface of said core, said cladding having a refractive index numerically lower than the refractive index of said exterior surface of said core;
   a first polymeric sleeve having a refractive index numerically lower than the refractive index of said exterior surface of said core, and possessing an inner surface disposed around and directly bonded to a portion of said exterior surface of said core adjacent said at least one polished end surface from which the surrounding portion of said polymeric cladding has been removed, an outer surface and a pair of annular end surfaces one of which abuts the unremoved portion of said polymeric cladding and the other of which is substantially flush with said at least one polished end surface; and
   a second polymeric sleeve of greater longitudinal length than said first sleeve, said second sleeve possessing an inner surface, a portion of which is telescopically disposed around and bonded to said outer surface of said first sleeve, an outer surface and a pair of annular end surfaces, one of which is substantially flush with said at least one polished end surface and the other of which is disposed around said polymeric cladding whereby, the junction between the first sleeve and the unremoved portion of the polymeric cladding is strain relieved and the polished end surface is substantially centered and mechanically restrained from any motion relative to the outer surface of the second sleeve, all without substantial degradation of the light propagating capability of the waveguide.

2. The optical waveguide of claim 1 wherein said glass fiber core is homogeneous and comprises a fused silica fiber which possesses a refractive index of about 1.46.

3. The optical waveguide of claim 2 wherein said polymeric cladding comprises a silicone rubber.

4. The optical waveguide of claim 3 wherein said first sleeve possesses a refractive index in the range from 1.32 to 1.44.

5. The optical waveguide of claim 4 wherein said first sleeve is formed with substantially uncrosslinked polyvinylidenefluoride.

6. The optical waveguide of claim 5 wherein said second sleeve has been crosslinked by exposure to electron beam radiation.

7. The optical waveguide of claim 1 wherein said glass fiber core is non-homogeneous and is formed with at least two regions of glass having differing indices of refraction.

8. The optical waveguide of claim 1 wherein said polymeric cladding comprises silicone rubber.

9. The optical waveguide of claim 1 wherein said polymeric cladding comprises a fluoropolymer.

10. The optical waveguide of claim 1 self-centered and terminated within the pre-aligned bore of an optical waveguide connector.

11. An optical waveguide comprising:
    a glass fiber core possessing at least one polished end surface and a substantially cylindrical exterior surface;
    a polymeric cladding disposed on and around said exterior surface of said core, said cladding having a refractive index numerically lower than the refractive index of said exterior surface of said core;
    a first polymeric sleeve having a refractive index numerically lower than the refractive index of said exterior surface of said core, and possessing an inner surface disposed around and directly bonded to a portion of said exterior surface of said core adjacent said at least one polished end surface from which the surrounding portion of said polymeric cladding has been removed, an outer surface and a pair of annular end surfaces one of which abuts the unremoved portion of said polymeric cladding and the other of which is substantially flush with said at least one polished end surface; and
    a second polymeric sleeve of greater longitudinal length than said first sleeve, said second sleeve possessing an inner surface, a portion of which is telescopically disposed around and bonded to said outer surface of said first sleeve, an outer surface and a pair of annular end surfaces, one of which is substantially flush with said at least one polished end surface and the other of which is disposed around said polymeric cladding, said second sleeve comprising a length of heat shrink tubing which has been heat recovered around said core and said first sleeve, wherein the junction between the first sleeve and the unremoved portion of the polymeric cladding is strain relieved and the polished end surface is substantially centered and mechanically restrained from any motion relative to the outer surface of the second sleeve, all without substantial degradation of the light propagating capability of the waveguide.

12. An environmentally sealed optical waveguide comprising:
    a glass fiber core possessing a substantially cylindrical exterior surface and a pair of polished end surfaces;
    a polymeric cladding disposed on and around said exterior surface of said core, said cladding having a refractive index numerically lower than the refractive index of said exterior surface of said core;
    a tubular, environmentally protective jacket coaxially disposed around said cladding and said core;
    a first pair of polymeric sleeves each having a refractive index numerically lower than the refractive index of said exterior surface of said core and each possessing an inner surface disposed around and directly bonded respectively to a portion of said exterior surface of said core adjacent each one of said pair of polished end surfaces from which the surrounding portions of said cladding and said jacket have been removed, an outer surface and a pair of annular end surfaces, one of which abuts a corresponding unremoved portion of said cladding and the other of which is substantially flush with the corresponding one of said pair of polished end surfaces; and
    a second pair of polymeric sleeves each being of greater longitudinal length than a corresponding one of said first pair of sleeves and each possessing an inner surface, a portion of which is disposed around and bonded to said outer surface of the corresponding one of said first pair of sleeves, an outer surface and a pair of annular end surfaces, one of which is substantially flush with the corresponding one of said pair of polished end surfaces and the other of which is adjacent another portion of said inner surface of said second sleeve which surrounds and is sealingly bonded to a selected portion of the exterior surface of said jacket whereby, the optical waveguide is environmentally sealed, the junctions between the cladding and the first pair of sleeves are strain relieved and each polished end surface is substantially centered and mechanically restrained from any motion relative to the outer surface of its corresponding second sleeve, all without substantial degradation of the light propagating capability of the waveguide.

13. The optical waveguide of claim 12 wherein said glass fiber core is homogeneous and comprises a fused silica fiber which possesses a refractive index of about 1.46.

14. The optical waveguide of claim 13 wherein said polymeric cladding comprises silicone rubber.

15. The optical waveguide of claim 14 wherein said second pair of sleeves has been crosslinked by exposure to electron beam radiation.

16. The optical waveguide of claim 13 additionally comprising adhesive bonds disposed between selected portions of said jacket and selected surrounding portions of said second pair of polymeric sleeves thereby forming an environmentally sealed waveguide.

17. The optical waveguide of claim 16 wherein said first pair of sleeves is formed with substantially uncrosslinked polyvinylidenefluoride.

18. The optical waveguide of claim 12 wherein said polymeric cladding comprises silicone rubber.

19. The optical waveguide of claim 12 wherein said polymeric cladding comprises a fluoropolymer.

20. The optical waveguide of claim 12 additionally comprising adhesive bonds disposed between selected portions of said jacket and selected surrounding portions of said second pair of polymeric sleeves thereby forming an environmentally sealed waveguide.

21. The optical waveguide of claim 20 wherein said adhesive is a hot melt adhesive.

22. A method for terminating an optical waveguide of the type formed with a glass fiber core possessing at least one terminal end and a substantially cylindrical exterior surface coated with a polymeric cladding having a refractive index numerically lower than the refractive index of said exterior surface of said core, which method comprise the steps of:
removing a portion of said cladding adjacent said at least one terminal end thereby exposing a cylindrical portion of said exterior surface of said core;
disposing a first sleeve about the exposed portion of said exterior surface of said core such than an annular end surface on said first sleeve abuts the unremoved portions of said cladding, said first sleeve being fabricated from a heat fuseable polymeric material having a refractive index numerically lower than the refractive index of said exterior surface of said core;
positioning a second sleeve of heat shrinkable polymeric material telescopically over said first sleeve and a portion of said cladding;
heating said first and second sleeves thereby causing said first sleeve to soften and fuse and said second sleeve to shrink radially urging said at least one terminal end of said core and said first and second sleeves into a contiguous bonded structure;
allowing said contiguous bonded structure to cool;
polishing said at least one terminal end of said core and said surrounding sleeves in a plane substantially perpendicular to the longitudinal axis of said core at said terminal end whereby, the junction between the first sleeve and the unremoved portion of the polymeric cladding is strain relieved and the polished end surface of the core is substantially centered and mechanically restrained from any motion relative to the outer surface of the second sleeve, all without substantial degradation of the light propagating capability of the waveguide.

23. The method of claim 22 wherein said first and second sleeves are prebonded together and positioned as a subassembly about the exposed portion of said exterior surface of said core prior to heating.

24. A method for terminating an optical waveguide of the type formed with a glass fiber core possessing at least one terminal end and a substantially cylindrical exterior surface coated with a polymeric cladding having a refractive index numerically lower than the refractive index of said exterior surface of said core, which method comprises the steps of:
removing a portion of said cladding adjacent said at least one terminal end thereby exposing a cylindrical portion of said exterior surface of said core;
disposing an article comprising a first sleeve and a second sleeve prebonded together, the first sleeve being about the exposed portion of said exterior surface of said core, such that an annular end surface on said first sleeve abuts the unremoved portions of said cladding, said second sleeve being telescopically disposed over a portion of said cladding, said first sleeve and said second sleeve being fabricated from a heat fuseable polymeric material having a refractive index numerically lower than the refractive index of said exterior surface of said core, and said second sleeve being fabricated if heat shrinkable polymeric material;
heating said first and second sleeves thereby causing said first sleeve to soften and fuse and said second sleeve to shrink radially urging said at least one terminal end of said core and said first and second sleeves into a contiguous bonded structure;
allowing said contiguous bonded structure to cool; and
polishing said at least one terminal end of said core and said surrounding sleeves in a plane substantially perpendicular to the longitudinal axis of said core at said terminal end.

* * * * *